Patented Sept. 30, 1924.

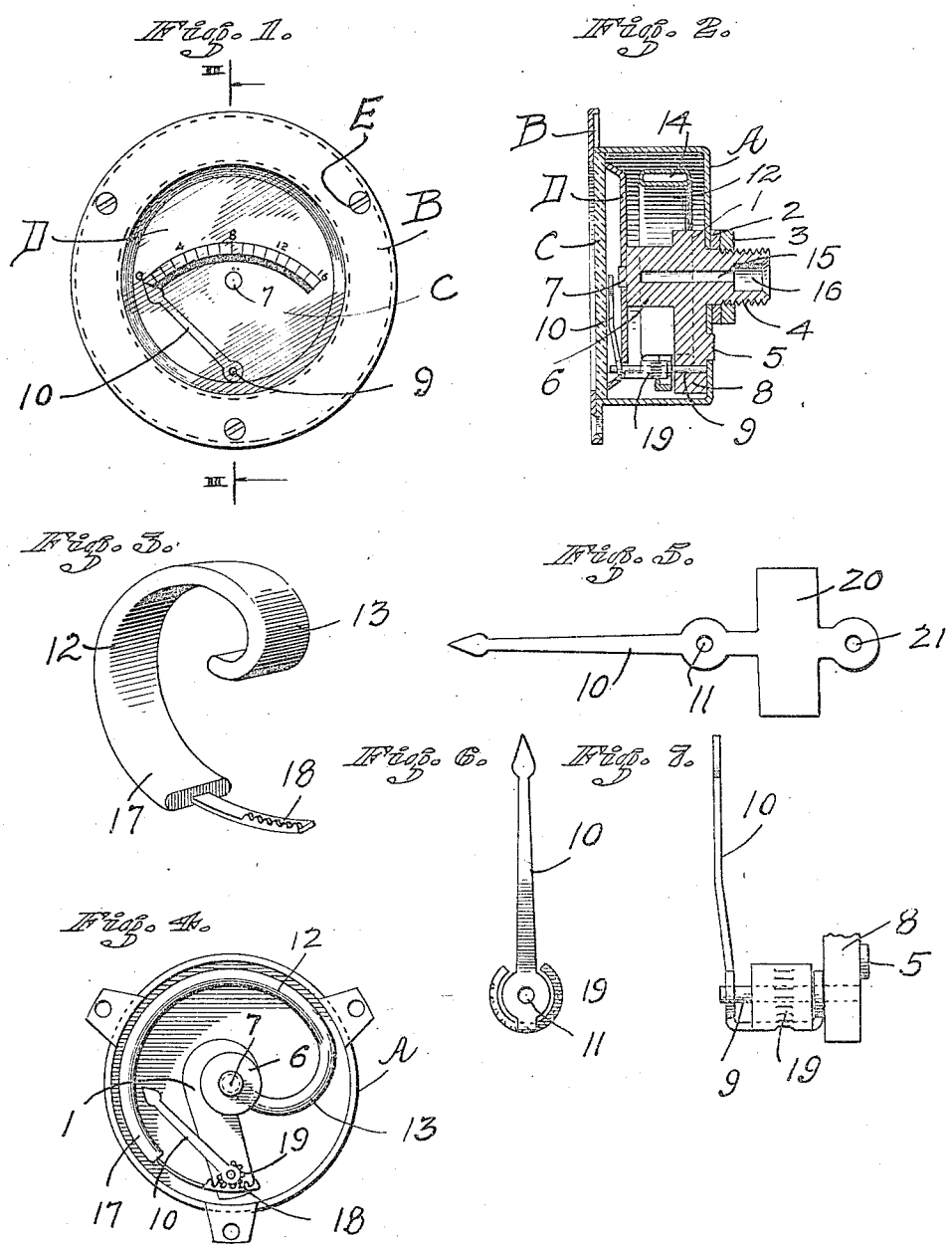

1,510,193

UNITED STATES PATENT OFFICE.

BEN P. PRYOR, JR., OF MAXWELL, CALIFORNIA.

PRESSURE GAUGE.

Application filed January 2, 1923. Serial No. 619,321.

*To all whom it may concern:*

Be it known that I, BEN P. PRYOR, Jr., a citizen of the United States, and a resident of Maxwell, county of Colusa, State of California, have invented a new and useful Pressure Gauge, of which the following is a specification.

My invention relates in general to gauges or indicators and has reference more particularly to a pressure gauge for use primarily in connection with automobiles for indicating the condition of the oil circulating system by gauging the oil pressure, and has the following objects in view:

First: To provide means positioned on the instrument board or other convenient location for indicating to the driver as well as any occupant of the vehicle the number of pounds of oil pressure in the forced feed lubrication system of the motor;

Second: To provide a pressure gauge with a minimum number of parts and to so assemble and construct these parts that the gauge may be produced inexpensively so that it may be sold on the market at a popular price;

Third: To provide a gauge which will accurately determine and measure the pressure of the forced lubricating system so that it may be relied upon with every degree of certainty and otherwise serve its intended purpose with the greatest of efficiency.

The invention possesses other features which will appear as the description now proceeds with reference to the accompanying drawing in which Figure 1 is a view in front elevation of the gauge showing the indicator face, Figure 2 is a vertical cross section on the line 2—2 of Figure 1. Figure 3 is a detail perspective view of the expansion tube; Figure 4 is a front elevation of the gauge showing the indicator face removed; Figure 5 is a plan view of the indicator or pointer and its associated parts showing the same as made from a cheap metal blank, Figure 6 is a front elevation of the pointer, and Figure 7 is a detail view in side elevation of the pointer or indicator after assembling it on the spindle which carries it.

Referring now to the drawing in detail A represents a suitable housing made to receive the annular ring B and carrying the glass lens C in front of the indicator face D. The ring B may be welded or otherwise suitably secured to the housing. The indicator face D is counter-sunk in the casing A. The periphery of the indicator face D engages the glass lens and holds it firmly against the ring B. The ring B is made with screw openings to receive screws or the like E for attaching the gauge to an instrument board or other support.

The center of the closed end of the housing A is made with an opening made to receive a core block (1), the same protruding into the housing and held rigidly within the same by a washer or the like (2) and a nut (3) bearing against the washer and threaded to the threaded end (4) of the core on the outside of the housing. The part of the core block within the housing is more or less irregular in shape but includes a shoulder to bear against the inside face of the housing around the opening so that the washer and nut produce a suitable clamping effect. To further fix the core against rotation within the housing a projection is made as at (5) on the same and an opening made in the closed end of the housing to receive the projection as best shown in Figure 2.

The barrel extension (6) of the core is made with an axial projection (7) made to be received and riveted in the center opening in the indicator face D. This centers the indicator face as well as supports the forward part of the core. An indentation is made with a center punch in the indicator face D close to the axial projection (7) which produces a counter mark in the end of the barrel extension (6). This punch mark is for the purpose of preventing the indicator face D from turning on the axial extension (7) and interfering with the movement of the pointer (10).

Mounted within the lower part of the core as at (8) is a spindle (9) the forward end of which extends through an opening in the lower part of the indicator face D. The spindle (9) may be secured to the core (8) in any suitable well known manner such as by tightly wedging the parts together. This spindle is made to receive the pointer or indicator (10) the same having an opening (11) to receive the spindle. The pointer or indicator is in no way fixed to the spindle, but on the other hand it is free to oscillate thereon.

Positioned behind the indicator face D within the housing is a pressure tube (12) the same being almost semi-circular in shape but including a bend (13), the end of which terminates so that the opening (14) (see Figure 2) within the tube may communicate with an opening (15) in the core block (1). This opening (15) in the core block (1) terminates at one end in an enlargement (16), and is made to communicate with a tube leading from the source of pressure supply. A tube may be threaded to the threaded end of the core block.

The opposite end (17) of the expansion tube (12) has a rack (18) the same extending beneath the spindle (9) so that the pinion (19) of the pointer or indicator (10) may engage therewith. The said rack (18) may be molded in the adjacent end of said tube (12). This pinion (19) on the pointer or indicator is made by corrugating in a suitable way the blank (20) at one end of the pointer or indicator and bending the same up so as to leave a circular design as best shown in Figure 6. To steady the pointer or indicator on the spindle (9) a second opening (21) is made behind the blank (20) so that the same may receive the spindle (9).

In operation, when the parts are assembled as described, pressure supplied to the opening (15) in the core block (1) will be thus transmitted to the expansion tube (12), and upon expansion of the same the rack will actuate the pointer or indicator (10), through its meshing engagement with the pinion (19), to swing the pointer to the right in a clockwise direction so as to successively register with the graduated strip on the indicator face D.

The housing A may be produced in one operation if made of aluminum or other such material. Furthermore, the pointer or indicator (10) may be made in one operation which will also include the blank for the pinion (19) and the blanks for making up the openings for receiving the spindle (9). The rack (18) may also be made in one operation but it should be produced from suitable metal to allow a certain amount of flexibility so that the teeth will snugly mesh with the pinion (19) to eliminate any play and also hold the pointer or indicator firmly on the spindle. These and other features, the most important of which have been described, make up a very compact, simple, and yet dependable and accurate device, and one that can be used with the greatest degree of satisfaction, and at the same time be sold at a popular price with a profit.

I claim:

1. In a pressure gauge, a housing, an expansion tube therein, means connecting said tube with a source of pressure supply, an indicator face on the housing including a graduated scale, a pointer co-acting with said scale, a pinion fixed to the pointer, and a rack connected to the expansion tube and meshing with said pinion, said connecting means comprising a core block having a bore adapted to open to the pressure supply, said expansion tube having one end secured to said block and communicating with said bore.

2. In a pressure gauge, a housing, a curved expansion tube therein, a core block in said housing, said block having a bore adapted to communicate with a pressure supply, one end of said tube being fixed to said block and communicating with said bore, the opposite end of the tube carrying a rack, an indicator face on the housing including a graduated scale, a spindle fixed in the housing, a pointer mounted thereon with its pointing end adapted to move across said graduated scale, and a pinion connected to said pointer and meshing with the rack on the end of the expansion tube substantially as and for the purpose described.

3. A pressure gauge as set forth in claim 2 and in which the pointer and pinion are formed from a single sheet of material having a blank bent in circular form and provided with an annular series of indentations providing teeth, portions respectively at the opposite sides of said blank having alined perforations receiving said spindle, and a pointer extension forming a continuation of one of said portions.

4. In a pressure gauge, a housing, a curved expansion tube therein, one end of said tube having a connection with a source of pressure supply, the opposite end of the tube carrying a rack, an indicator face on the housing including a graduated scale, a spindle fixed in the housing, a pointer structure having a pair of spaced openings to receive said spindle and a pinion formed between said openings adapted to mesh with the rack on the end of the expansion tube, for moving the pointing end of the pointer across the graduated scale on the indicator face when the expansion tube is active, said pointer and pinion formed of a single blank of material having a part rolled in gear form and provided with spaced portions in which the aforesaid openings are formed.

5. A pressure gauge comprising a housing having a graduated dial and an oscillating pointer co-acting therewith, a core block fixed in the housing and provided with a bore adapted to communicate with a source of pressure supply, and an expansion tube fixed to the block and communicating with said bore and having a free end provided with a fixed rack bar, and a gear co-acting with said rack bar and said pointer to move the latter on actuations of said tube.

BEN P. PRYOR, Jr.